United States Patent [19]
Swaidner et al.

[11] Patent Number: 5,762,968
[45] Date of Patent: Jun. 9, 1998

[54] METHOD AND APPARATUS FOR PRODUCING IMITATION GRILL MARKS ON FOOD WITHOUT USING HEAT

[76] Inventors: Scott Duane Swaidner, 3727 S. 600 E., Pierceton, Ind. 46562; Donald Ratliff, 115 EMS B40 La., Leesburg, Ind. 46538

[21] Appl. No.: 614,276

[22] Filed: Mar. 12, 1996

[51] Int. Cl.$^6$ ............................................. A47J 43/20
[52] U.S. Cl. ................... 425/96; 425/90; 425/104; 425/105; 425/363; 425/373; 425/385
[58] Field of Search .................. 425/90, 104, 96, 425/105, 363, 373, 385

[56] References Cited

U.S. PATENT DOCUMENTS 4,905,587   3/1990   Smithers ........................... 99/534

Primary Examiner—David W. Wu
Attorney, Agent, or Firm—Baker & Daniels

[57] ABSTRACT

Method and apparatus for producing imitation grill marks on food items without applying heat to the items in forming the grill marks. The apparatus has a sprayer that applies a colorized solution to the items and a press that forms indentations on the items, impregnating the solution into the indentations and permitting the solution to collect in the indentations.

12 Claims, 1 Drawing Sheet

METHOD AND APPARATUS FOR PRODUCING IMITATION GRILL MARKS ON FOOD WITHOUT USING HEAT

FIELD OF THE INVENTION

The present invention relates to a method and apparatus for producing imitation grill marks on food items without applying heat to the items in forming the grill marks.

DESCRIPTION OF THE RELATED ART

Many consumers prefer grilled food. In fact, food manufacturers have discovered that, for reasons unrelated to taste, consumers prefer food which has a grilled appearance, even if the food was not actually grilled during preparation. Thus, since it is often not feasible for food manufacturers to actually grill their food products, some manufacturers apply imitation grill marks to give their products the appearance of having been grilled during preparation.

Machines for producing imitation grill marks have heretofore used a stamp or roller with a heated grill mark pattern which burned an imprint of the pattern on the surface of the food. These machines are undesirable because the burned imprints affect the taste of the food. Also, since high temperature grill mark applicators produce the most well-defined imprints by burning the fat content of the food, such applicators do not function well with low fat foods, such as certain lean meat products. Additionally, when products are burned with a high temperature applicator, they tend to stick to the applicator, complicating the production process. Finally, high temperature applicators are expensive to operate because they consume substantial electrical power to maintain the heated pattern at a sufficiently elevated temperature.

SUMMARY OF THE INVENTION

The present invention provides an apparatus and a non-heated method for producing imitation grill marks on food items by applying a water-based colorized solution to food items in association with pressurized imprinting.

The invention comprises, in one form thereof, a machine with a conveyer that moves the food items under a first set of spray applicators which pre-coat the items with the colorized solution. The coated items are then conveyed under a roller which compresses them, simultaneously creating a pattern of indentations and impregnating the indentations with the pre-applied colorized solution. Then, the items are conveyed under a second set of spray applicators which apply a second coat of colorized solution that collects in the indentations. When the items are heated by the consumer at meal time, the water portion of the solution evaporates leaving the colorized material within the indentations to produce a pattern of darkened lines resembling grill marks. As such, the present invention provides imitation grill marks without applying heat to the food items in forming the marks, thus avoiding the disadvantages associated with high temperature grill mark applicators.

An object of the present invention is to provide a method and apparatus for producing marks on food items that resemble grill marks.

Another object is to provide a method and apparatus for producing imitation grill marks on food items without applying heat to the items in forming the grill marks.

Yet another object is to provide a method and apparatus for producing imitation grill marks on food items without significantly affecting the taste of the items.

Still another object of the present invention is to provide a method and apparatus for effectively producing imitation grill marks on low-fat food items.

The above-mentioned and other objects and advantages of this invention, and the manner of attaining them, will become more apparent and the invention will be better understood by reference to the following description of an embodiment of the invention.

DESCRIPTION OF THE DRAWING

The sole drawing is a perspective view of the apparatus used in the method of the present invention, a portion of the apparatus being broken away for illustration purposes.

DESCRIPTION OF THE INVENTION

Figure 1:
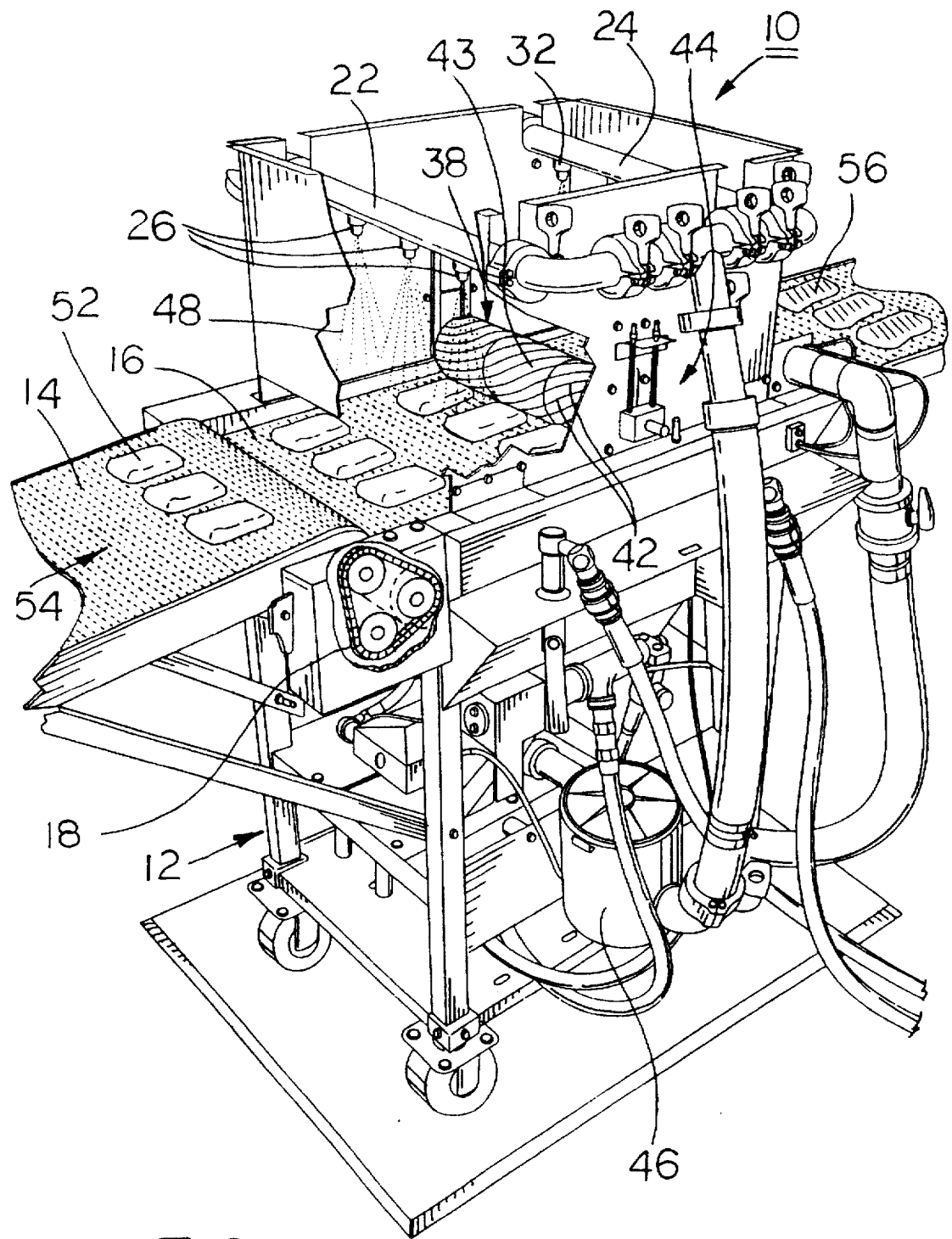

The exemplification set out herein illustrates one embodiment of the invention, in one form, and is not to be construed as limiting the scope of the invention in any manner.

Referring now to the drawing, there is shown the apparatus of the present invention generally referred to by the numeral 10. Apparatus 10 includes a frame 12 which supports feed conveyor belt 14 and main conveyor belt 16. Belts 14,16 are powered by common motorized chain and sprocket drive mechanism 18. Housing 20 is mounted to frame 12 above main belt 16, partially enclosing main belt 16. Spray bars 22 and 24 are mounted within housing 20 over belt 16 near the inlet side and the outlet side respectively of housing 20. Spray nozzles 26 extend downward from spray bar 22 toward main belt 16. Spray nozzles 32 (only one shown) likewise extend downward from spray bar 24. A roller press 38 is mounted within housing 20 under spray bars 22,24. Press 38 is made of stainless steel or other hygienic material, and is rotatably suspended above main belt 16 by bearing mounts 44 located on opposite sides of housing 20. Mounts 44 are each adjustably secured to a side of housing 20 to provide for adjustment of the distance between press 38 and main belt 16. The surface of press 38 forms a pattern of raised ridges 42. Ridges 42 are equally spaced and spiral around the outer surface of press 38 from one end to the other.

Motorized pump 46 forces colorized solution 48, which is a low-viscosity, water-based, caramelized liquid, through plumbing into manifold 50 which is connected to and supplies spray bars 22,24. A collection reservoir (not shown) is mounted below main belt 16 to collect excess solution and return it to pump 46 for reuse.

MODE OF OPERATION

In operation, food items 52, such as pieces of meat, are loaded onto feed belt 14. Feed belt 14 moves items 52 in the direction of arrow 54 onto main belt 16 which rotates at the same speed and in the same direction as feed belt 14. Main belt 16 transports food items 52 under housing 20 where they pass under spray bar 22 for a pre-coat of solution 48. Spray nozzles 26 of bar 22 point toward main belt 16 and diffuse pumped solution 48 into a fine mist which drops onto items 52 as they are transported upon belt 16 in direction 54. The portion of the sprayed solution 48 that does not adhere to the items 52 collects in a collection reservoir below housing 20 for recycling as further described below.

Main belt 16 then transports pre-coated items 52 to press 38 enclosed within housing 20. The distance between press 38 and the top surface of main belt 16 is adjusted to a predetermined height by raising or lowering the press using adjustable bearing mounts 44. For optimum performance, press 38 should be adjusted so that the distance from the top of main belt 16 to valleys 43 between ridges 42 is approximately equal to the height of food item 52. As should be apparent from the drawing, mounts 44 allow press 38 to accommodate items 52 of different sizes.

As items 52 pass under press 38, the ridges 42 of the press engage and compress items 52, causing press 38 to rotate. As press 38 rotates, ridges 42 deform the surface of items 52 and create generally diagonal indentations 56 in items 52. Ridges 42 also press the pre-coating of solution 48 into food items 52 with some of the solution collecting in the indentions 56. It should be apparent that various presses 38 could be made to create different patterns on items 52, such as marks which are perpendicular relative to direction 54.

After items 52 are indented, they are transported under spray bar 24 which applies a second mist of solution 48 through its nozzles 32 in substantially the same manner as spray bar 22 previously described. Solution 48 from this second application naturally collects within indentations 56. Since colorized solution 48 is of low viscosity, much of it runs off items 52 before the items exit housing 20. However, the pre-coat of solution 48 impregnated in indentations 56 and a substantial amount of the second coating remain in indentations 56. Run-off and over-spray of solution 48 resulting from the spray applications are collected for recycling in the collection reservoir below main belt 16. The reservoir feeds the collected solution into pump 46 which pumps the solution into manifold 50. The processes and hardware available for collecting and pumping the solution 48 are well known in the art and do not comprise a part of this invention.

The coated items 52 exit housing 20 under power of main belt 16. Coated items 52 are removed from belt 16, and processed for shipment. The consumer prepares items 52 for eating by heating or cooking the items 52 using conventional means. When heated, the water component of solution 48 upon the items evaporates and the colored material within indentations 56 becomes darker, creating the appearance of charred, grill marks.

While this invention has been described as having an exemplary embodiment, the present invention can be further modified within the spirit and scope of this disclosure. In particular, it should be understood that the imitation grill marks of the present invention can also be produced using a single application of colorized solution 48 in conjunction with press 38. Furthermore, visible grill-like marks will result regardless of whether solution 48 is applied to items 52 before or after press 38 forms indentations 56. Accordingly, this application is intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. Apparatus for producing imitation grill marks on food items without applying heat to the items in forming the grill marks comprising:

a frame;

press means carried by said frame for producing indentations on the items; and application means carried by said frame for applying a colorized solution to the items so that at least a portion of said solution collects in said indentations.

2. Apparatus of claim 1 wherein said application means includes means for applying a first amount of said solution to the items before the items are indented and means for applying a second amount of said solution to the items after the items are indented.

3. Apparatus of claim 1 further comprising a conveyor mounted to said frame for conveying the items between said application means and said press means.

4. Apparatus of claim 2, wherein said means for applying said first amount of said solution includes a sprayer for spraying said first amount of said solution on the items.

5. Apparatus of claim 4, wherein said means for applying said second amount of said solution includes a sprayer for spraying said second amount of said solution on the items.

6. Apparatus of claim 3, wherein said press means is mounted to said frame in spaced relationship to said conveyor.

7. Apparatus of claim 6 wherein said application means includes a first pipe and a second pipe, said pipes supported by said frame above said conveyor and being in fluid communication with a source of said colorized solution, said first pipe having opening means for releasing said solution onto the items before the items are indented, said second pipe having opening means for releasing said solution onto the items after the items are indented.

8. Apparatus of claim 3, wherein said press means includes a cylindrical roller mounted to said frame for rotation about its longitudinal axis, said roller having an outer surface with ridge means extending therefrom for contacting the items to produce said indentations.

9. Apparatus of claim 8 wherein said ridge means includes a plurality of spaced parallel ridges forming a diagonal, spiraling pattern on said outer surface.

10. Apparatus of claim 8, said conveyor constituting means for moving the items under said roller with said roller contacting the items and rotating with the items to produce said indentations on the items.

11. Apparatus of claim 10 wherein said roller is supported by an adjustment means mounted to said frame for adjusting said roller toward and away from said conveyor.

12. Apparatus of claim 1 further comprising a housing carried by said frame partially enclosing said application means and said press means to contain said solution.

* * * * *